US012562050B2

(12) United States Patent
Museau

(10) Patent No.: US 12,562,050 B2
(45) Date of Patent: Feb. 24, 2026

(54) ACTIVE PERSONAL WIRELESS CONNECTIVITY NETWORK INTERFACE SYSTEM

(71) Applicant: MUSEAU TECH GROUP, Berlin, NJ (US)

(72) Inventor: Gerard Museau, Berlin, NJ (US)

( * ) Notice: Subject to any disclaimer, the term of this patent is extended or adjusted under 35 U.S.C. 154(b) by 94 days.

(21) Appl. No.: 18/507,333

(22) Filed: Nov. 13, 2023

(65) Prior Publication Data

US 2025/0157321 A1 May 15, 2025

(51) Int. Cl.
*G08C 17/02* (2006.01)
*A43B 3/48* (2022.01)
*H04B 1/3827* (2015.01)

(52) U.S. Cl.
CPC ............... *G08C 17/02* (2013.01); *A43B 3/48* (2022.01); *H04B 1/385* (2013.01)

(58) Field of Classification Search
CPC .. G08C 17/02; A43B 3/48; A43B 3/44; A43B 3/34; A43B 3/36; A43B 17/00; A43C 19/00; H04B 1/385
See application file for complete search history.

(56) References Cited

U.S. PATENT DOCUMENTS

2009/0134715 A1* 5/2009 Mozar ........................ G06F 1/26
                                                          361/170
2016/0366266 A1* 12/2016 Chung ................... H04B 1/385

2018/0338561 A1* 11/2018 Destrian ................ G08B 25/10
2020/0196699 A1* 6/2020 Andon .................... G08G 1/164
2020/0297064 A1* 9/2020 Molyneux .......... A63B 24/0062
2022/0015496 A1* 1/2022 Henrichot .............. G05B 15/02
2022/0395229 A1* 12/2022 Everett ................ A61B 5/1038
2022/0408872 A1* 12/2022 Chou ................... A61B 5/1038
2024/0358529 A1* 10/2024 Bishay ................... A61F 2/586

OTHER PUBLICATIONS

Carrozza et al., "A Wearable Biomechatronic Interface for Controlling Robots with Voluntary Foot Movements,"; IEEE/ASME Transactions on Mechatronics, vol. 12, No. 1, Feb. 2007, retrieved on [Jun. 7, 2025]. Retrieved from <URL:https://ieeexplore.ieee.org/abstract/document/4088963> entire document (Year: 2007).*

* cited by examiner

*Primary Examiner* — Adnan Aziz
(74) *Attorney, Agent, or Firm* — Stanzione & Associates, PLLC; Patrick Stanzione

(57) ABSTRACT

A self-contained body assisted battery powered wireless connectivity network system including a wireless network interface insole which can be completely enclosed within a footwear and have embedded therein a plurality of electronic switches each to wirelessly operate one of a plurality of electronically operated devices of a vehicle, residence or other electronically controlled environment. The system can also include an external electronic device to be electronically wired to a plurality of electronically operated devices of a vehicle or residence, or other electronically controlled environment.

8 Claims, 6 Drawing Sheets

ACTIVE PERSONAL WIRELESS CONNECTIVITY NETWORK INTERFACE SYSTEM

STATEMENT REGARDING FEDERALLY SPONSORED RESEARCH OR DEVELOPMENT

Not applicable.

COPYRIGHT NOTICE

BACKGROUND OF THE INVENTIVE CONCEPT

Field of the Invention

The present inventive concept relates to a self-contained bodily assisted wireless connectivity network interface apparatus and system to control multiple features of an external electronic device or system. More particularly, but not exclusively, this inventive concept relates to a self-contained bodily assisted wireless connectivity network interface apparatus which can be completely enclosed within a footwear to wirelessly operate multiple electronic features of an external electronic device (together referred to as the system) by movement of toes within the footwear.

Description of the Related Art

Wireless electronic key devices, such as electronic keys, are commonly known to provide remote access to vehicles. These electronic key devices function via radio waves, and can be used to unlock car doors and can even be used to start an engine of the vehicle. These electronic keys are generally required to be close to the vehicle equipped with a radio receiver but have been known to access a vehicle from up to 3000 feet away from the vehicle. The wireless electronic key device and the radio receiver have the same set of codes such that when the codes match the doors of the vehicle the doors of the vehicle can be remotely unlocked. This wireless electronic key device and receiver combination system is limited to unlocking the doors of the vehicle and starting the engine of a vehicle.

There is a need for a bodily assisted wireless connectivity network interface to control multiple features of an external electronic device or system.

There is also a need for a bodily assisted wireless connectivity network interface to control multiple features of an external electronic device or system which can be completely hidden from sight at all times.

There is also a need for a bodily assisted wireless connectivity network interface to communicate wireless signals to operate multiple features of a vehicle, while remaining hidden from sight.

There is also a need for a bodily assisted wireless connectivity network interface to communicate wireless signals to operate multiple features of a building, such as a personal residence, while remaining hidden from sight.

There is also a need for a wireless connectivity network interface apparatus which is theft-proof.

There is also a need for a wireless connectivity network interface apparatus which is free from being misplaced or dropped.

There is also a need for a battery assisted wireless connectivity network interface apparatus for arm amputees.

There is also a need for a battery assisted wireless connectivity network interface apparatus and system which are completely hands free.

SUMMARY OF THE INVENTIVE CONCEPT

The present general inventive concept provides a self-contained bodily assisted wireless connectivity network interface apparatus and system to control multiple features of an external electronic device or system. More particularly, but not exclusively, this inventive concept relates to a self-contained bodily assisted wireless connectivity network apparatus and system which can include an insole to be completely enclosed within a footwear to wirelessly operate multiple electronic features of an external electronic device or system by movement of toes within the shoe, and an electronic controlled device which can be wired to the external electronic device or system and operated by the insole.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a wireless network interface insole for footwear, comprising: a plurality of switches integrated therein to correspond with toes of a user of the footwear, each switch configured to generate a corresponding electronic signal when pressed; a central switching module electrically connected to each of the plurality of switches to receive the electronic signals generated by the plurality of switches, to process the received signals and to transmit the processed signals; a multi-channel transmitter TX to receive the processed signals from the central switching module and to generate and transmit a unique coded radio frequency signal to perform a function for each of the processed signals received; and a receiver to receive an indication signal from an external device in response to each coded radio frequency signal transmitted indicating that the corresponding function has been performed.

In an exemplary embodiment, the plurality of switches can include five switches, each switch being configured to rest within the insole and under a respective one of five toes of a user.

In another exemplary embodiment, the wireless network interface insole can also comprise an annunciator disposed therein to signal the user that an indication signal has been received.

In another exemplary embodiment, the wireless network interface insole can also comprise an insole cover connected to and disposed above a front end of the insole, the insole cover including a plurality of switches integrated therein to correspond with toes of a user of the footwear, each switch configured to generate a corresponding electronic signal when pressed and transmit the generated electronic signals to the central switching module.

In still another exemplary embodiment, the wireless network interface insole can also comprise a corresponding one of the unique coded radio frequency signals transmitted by the multi-channel transmitter TX and to transmit the coded radio frequency signals to a corresponding activation device, and at least one activation device configured to activate a connected device when a coded radio frequency signal is received from a receiver of the main receiver unit.

In still another exemplary embodiment, the at least one activation device includes a plurality of activation devices, and the connected device includes at least one of an electronic door lock of a vehicle, a trunk release switch of a vehicle, an ignition of a vehicle, a brake of a vehicle.

In still another exemplary embodiment, the at least one activation device includes a plurality of activation devices, and the connected device includes at least one of an electronic door lock of a residence, an electronic garage door opener, and main lights of the residence.

The foregoing and/or other features and utilities of the present general inventive concept may be achieved by providing an active personal wireless connectivity network system, comprising: a wireless network interface insole insertable into a footwear, the wireless network interface insole including: a plurality of electronic switches disposed therein, each electronic switch configured to align with a corresponding toe of a human's foot that rests on the insole; a central switching module configured to receive an electronic signal from each of the plurality of electronic switches which are pressed by a corresponding toe, to process the received electronic signals and to transmit the processed signals; and a multi-channel transmitter TX to receive the processed signals from the central switching module and to generate and transmit a unique coded radio frequency signal for each of the processed signals received; and an external electronically controlled device configured to be connectable to a plurality of electronically operated devices of a vehicle, the external electronically controlled device including: a main receiver unit including a plurality of receivers, each receiver configured to receive a corresponding one of the unique coded radio frequency signals transmitted by the multi-channel transmitter TX and to operate a corresponding one of the plurality of electronically operated devices of the vehicle.

In an exemplary embodiment, the active personal wireless connectivity network system may further comprise an insole cover connected to and disposed above a front end of the insole, the insole cover including a plurality of switches integrated therein to correspond with toes of a user of the footwear, each switch configured to generate a corresponding electronic signal when pressed and to transmit the generated electronic signals to the central switching module.

In an exemplary embodiment, the active personal wireless connectivity network system may further comprise: a receiver formed in the insole to receive an indication signal from the external electronically controlled device in response to each coded radio frequency signal transmitted indicating that one of the plurality of electronically operated devices has been operated; and an annunciator disposed in the insole to signal the user that the indication signal has been received.

The foregoing and/or other features and utilities of the present general inventive concept may be achieved by providing a wireless network interface communication system, comprising: a first insole for footwear, comprising: a plurality of switches integrated therein to correspond with toes of a user of the footwear, each switch configured to generate a corresponding electronic signal when pressed; a central switching module electrically connected to each of the plurality of switches to receive the electronic signals generated by the plurality of switches, to process the received signals and to transmit the processed signals; a multi-channel transmitter TX to receive the processed signals from the central switching module and to generate and transmit a unique communication radio frequency signal; and a receiver to receive a unique communication radio frequency signal from another insole for footwear; and a second insole for footwear, comprising: a receiver to receive unique communication radio frequency signals from the first insole for footwear and an annunciator to notify the user of the second insole when a unique frequency signal is received from the first insole.

In an exemplary embodiment, the second insole may further comprise: a plurality of switches integrated therein to correspond with toes of a user of the footwear, each switch configured to generate a corresponding electronic signal when pressed; a central switching module electrically connected to each of the plurality of switches to receive the electronic signals generated by the plurality of switches, to process the received signals and to transmit the processed signals; and a multi-channel transmitter TX to receive the processed signals from the central switching module and to generate and transmit a unique communication radio frequency signal.

BRIEF DESCRIPTION OF THE DRAWINGS

These and/or other features and utilities of the present inventive concept will become apparent and more readily appreciated from the following description of the embodiments, taken in conjunction with the accompanying drawings of which.

Figure 1:
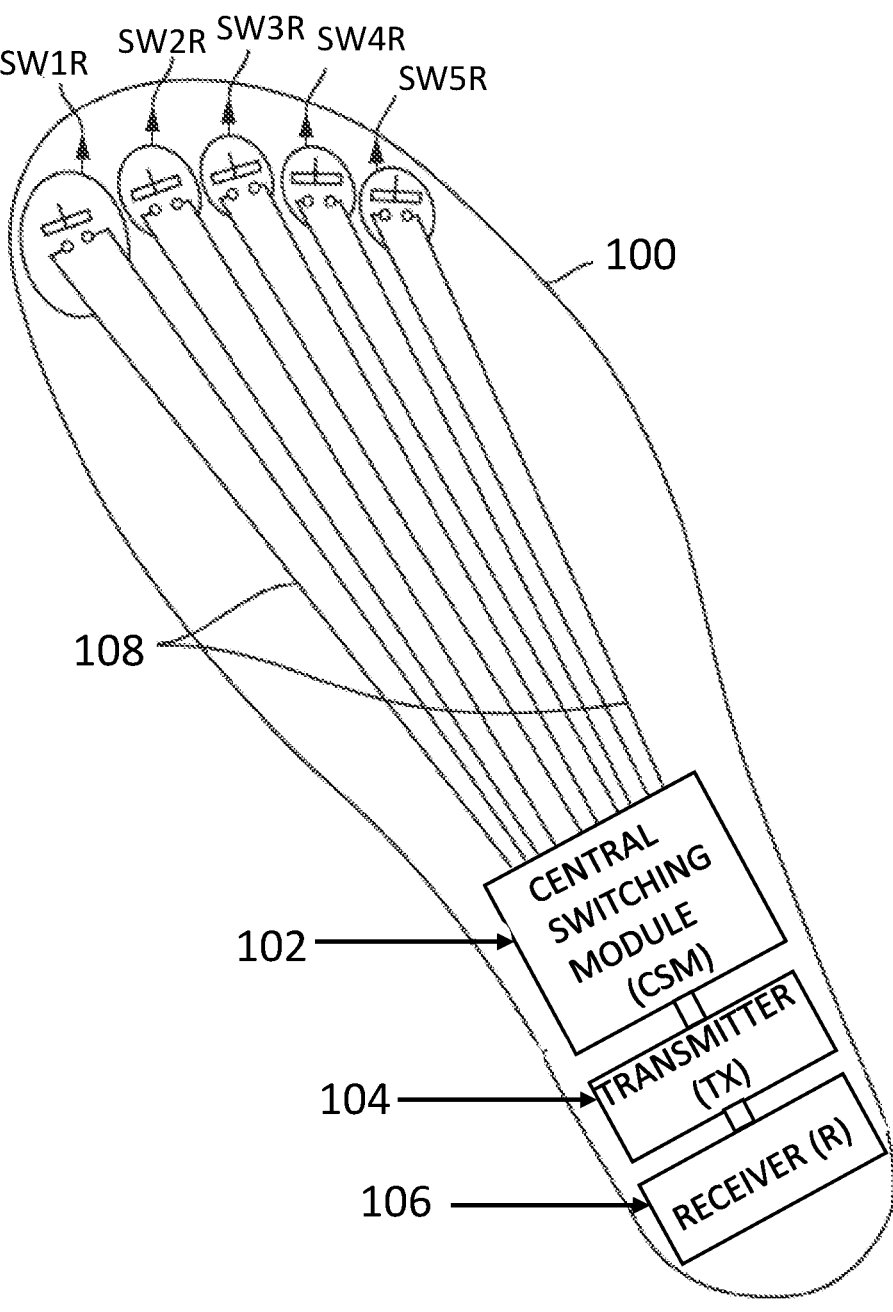
FIG. 1 illustrates a top plan view of an insole wireless network interface for a right shoe, according to an exemplary embodiment of the present inventive concept.

The drawings illustrate a few example embodiments of the present inventive concept, and are not to be considered limiting in scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" or "module" indicate a unit to process at least one function or operation, wherein the unit and the module may be embodied as hardware or software or embodied by combining hardware and software.

Hereinafter, one or more exemplary embodiments of the present general inventive concept will be described in detail with reference to accompanying drawings.

Example embodiments of the present general inventive concept are directed to a self-contained bodily assisted wireless connectivity network interface apparatus and system to control multiple features of an external electronic device or system. More particularly, but not exclusively, this inventive concept relates to a self-contained bodily assisted wireless connectivity network interface apparatus which can be completely enclosed within a footwear to wirelessly operate multiple electronic features of an external electronic device (together referred to as the system) by movement of toes within the footwear.

Figure 2:
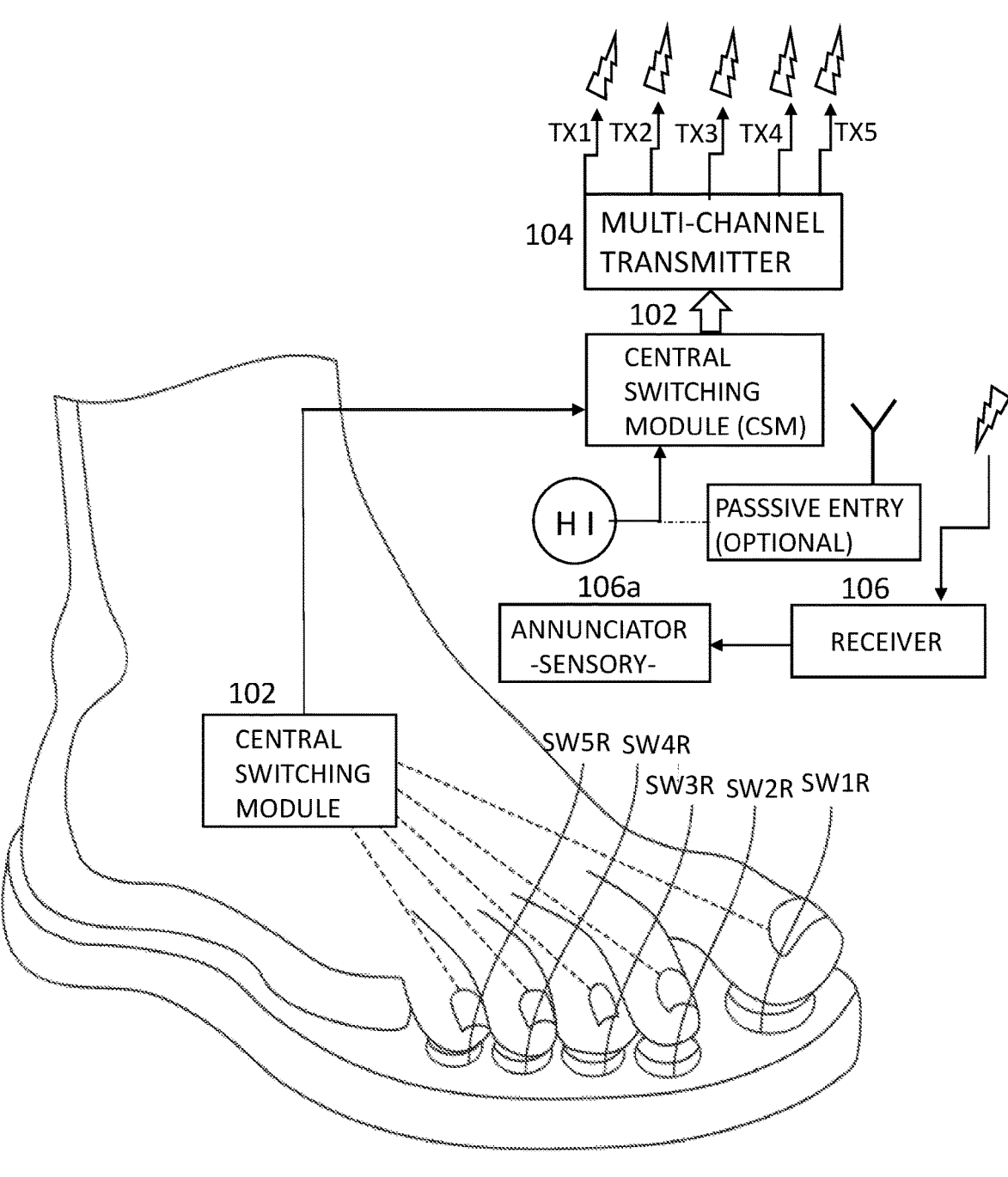
FIG. 2 illustrates a perspective plan view of the insole wireless network interface for a right shoe, according to the exemplary embodiment of FIG. 1.

FIG. 1 illustrates a top plan view of an insole wireless network interface 100 for a right shoe or other footwear, according to an exemplary embodiment of the present inventive concept. FIG. 2 illustrates a perspective view of the insole wireless interface 100 for a right shoe or other footwear, according to the exemplary embodiment of FIG. 1. The insole wireless network interface 100 can be formed of any type of material generally used to form an insole of a footwear. However, the insole wireless interface 100 is further configured to include a plurality of switches and wiring patterns, as well as additional electronic circuits, as described in more detail below. The insole wireless network interface 100 is configured to fit into a right shoe (or other similar footwear), and therefore is completely free of any visible encumbrances, such as a hand-held device, a watch or mobile phone, key, fob or tag. In other words, this insole wireless network interface 100 is not visible to others, making this device theft-proof and free from being misplaced or dropped.

Referring to FIGS. 1 and 2, the insole based wireless network interface 100 can be embedded at a front portion of the insole with a plurality of pushbutton switches, such as switch 1 right foot (SW1R), switch 2 right foot (SW2R), switch 3 right foot (SW3R), switch 4 right foot (SW4R) and switch 5 right foot (SW5R). These switches SW1R-SW5R are preferably disposed at the front portion of the insole and at positions where the five respective toes of a user (herein after referred to as a "user") will rest when a right foot of a user is resting on the insole based wireless network interface 100. The insole wireless network interface 100 can also be configured to have embedded therein a Central Switching Module (CSM) 102, a wireless Multi-channel Transmitter (TX) 104 and a wireless Receiver R 106. The Central Switching Module (CSM) 102 can be directly connected to each of the switches SW1R-SW5R via a wiring harness 108. The wiring harness 108 can be configured to send a switched signal from each of the switches SW1R-SW5R to the Central Switching Module (CSM) 102 when one or more of the switches SW1R-SW5R is pressed with a respective toe of a user. When one or more of the switches SW1R-SW5R is pressed, the Central Switching Module (CSM) 102 receives a signal from the corresponding switch or switches that was/were pressed, and then the Central Switching Module 102 processes and transmits the processed signals to the Multi-channel Transmitter TX 104. The signals processed by the Central Switching Module (CSM) 102 include information indicating which switch(es) was/were pressed. In response to receiving the signal from the Central Switching Module (CSM) 102, the Multi-channel Transmitter TX 104 will wirelessly transmit a coded radio frequency signal TX1, TX2, TX3, TX4 or TX5 externally, wherein the specific coding will depend on which switch or switches SW1R-SW5R was/were pressed. For example, if switch SW1R is pressed, the Multi-channel Transmitter TX 104 will wirelessly transmit a coded radio frequency signal TX1, etc., which will be received by an externally disposed electronically controlled device 500, which is configured to be electronically connected to and operate a separate device or system, such as a vehicle, as described in more detail below with respect to FIG. 5.

The receiver R 106 can include an annunciator 106a, which can be a bodily sensory alert which notifies a user when a control signal transmitted by the Multi-channel Transmitter TX 104 has been received and has performed a specific corresponding function. For example, while a switch SW1R embedded in the insole wireless network interface 100 may be configured to generate a specifically coded signal to notify the Central Switching Module 102 of an instruction that an engine in an automobile is to be started (or a lock on a front door of a residence is to be opened), once the switch SW1R is pressed by a big toe of a user, the Central Switching Module 102 will forward this instruction signal to the Multi-channel Transmitter TX 104. The Multi-channel Transmitter TX 104 will in turn wirelessly transmit a signal TX1 externally to be received by a wireless electronically Controlled External Device 500 configured with a multi-channel receiver. This signal TX1 will cause the electronically Controlled External Device 500 to start the engine of an automobile (or operate a lock on a front door or a residence) in which the wireless electronically Controlled External Device 500 is wired therein (or thereto). Similarly, the switches SW2R-SW5R may be configured to generate specifically coded signals to notify the Central Switching Module 102 that, for example, a door of the automobile is to be unlocked, a trunk of the automobile is to be unlocked/opened, an alarm is to be activated or deactivated, etc. Each of these signals can be converted into a wireless coded signal TX2, TX3, TX4 or TX5 and transmitted by the Multi-channel Transmitter TX 104 to be received by the wireless electronically controlled external device 500, wired within the automobile, to perform a specific operation with respect to the specifically wired automobile. These switches SW1R-SW5R can be enabled independently of each other or can be enabled in tandem. When configured to operate in tandem a combination of switches can be configured to cause the Central Switching Module 102 to provide yet a different predetermined enable signal to the Transmitter TX 104, which in turn can wirelessly transmit a predetermined coded radio signal corresponding to the combination of switches configured to be pressed in tandem. In other words, while each one of the switches SW1R-SW5R can be configured to generate a specifically coded signal to perform a specific operation, a combination of any one of the switches SW1R-SW5R can be configured to generate yet a different additional coded signal to perform a different operation than each of the switches SW1R-SW5R individually.

It is to be noted that each of the wireless coded signals transmitted by the Multi-channel Transmitter TX 104 can also be configured to operate different features of a residence, such as a front door lock, garage door, lights, music, etc., by wiring the wireless electronically controlled external device 500 to the different features of the residence.

Figure 3:
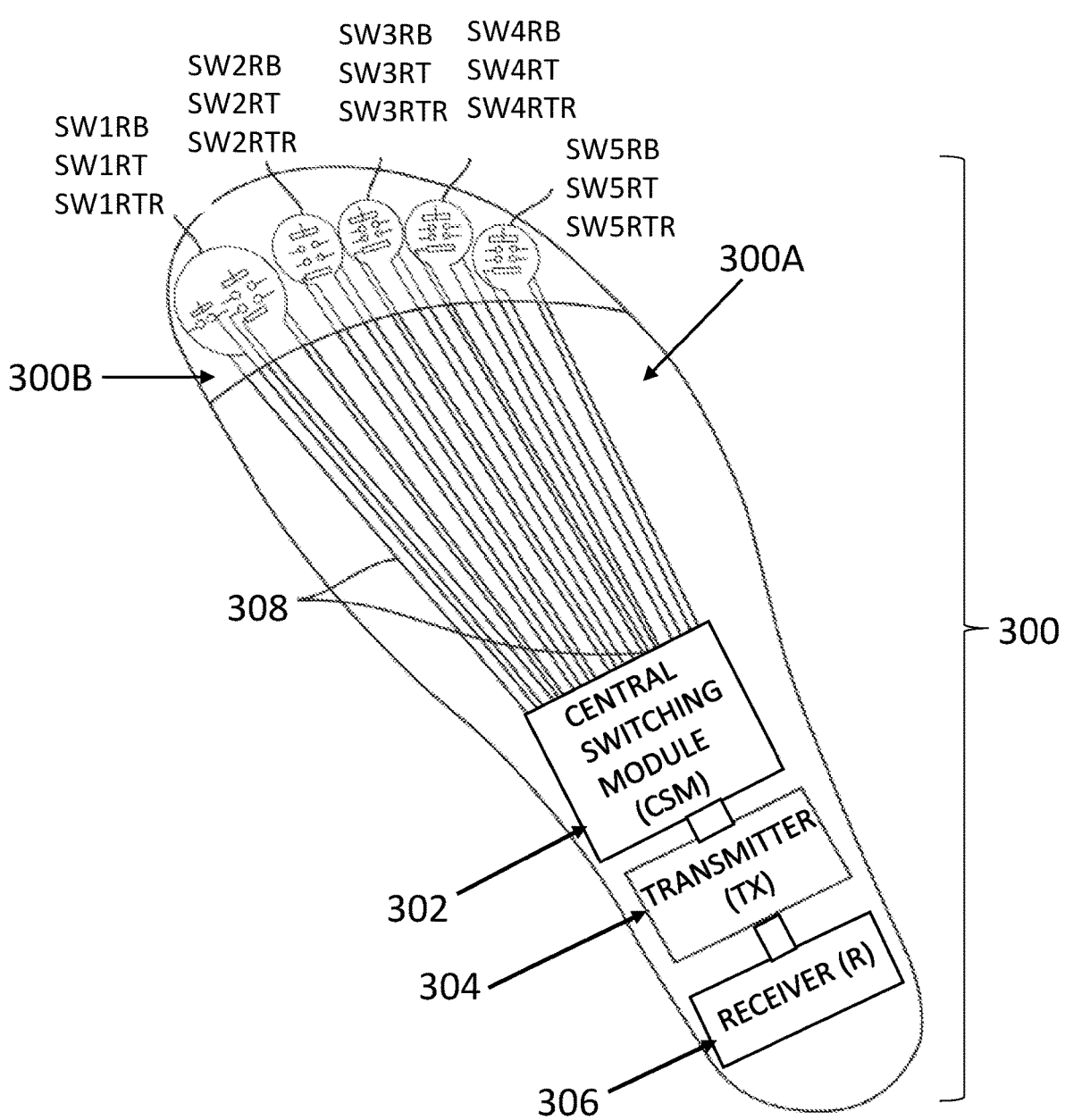
FIG. 3 illustrates a top plan view of a combination insole and insole cover wireless network interface for a right shoe, according to an exemplary embodiment of the present inventive concept.
Figure 4:
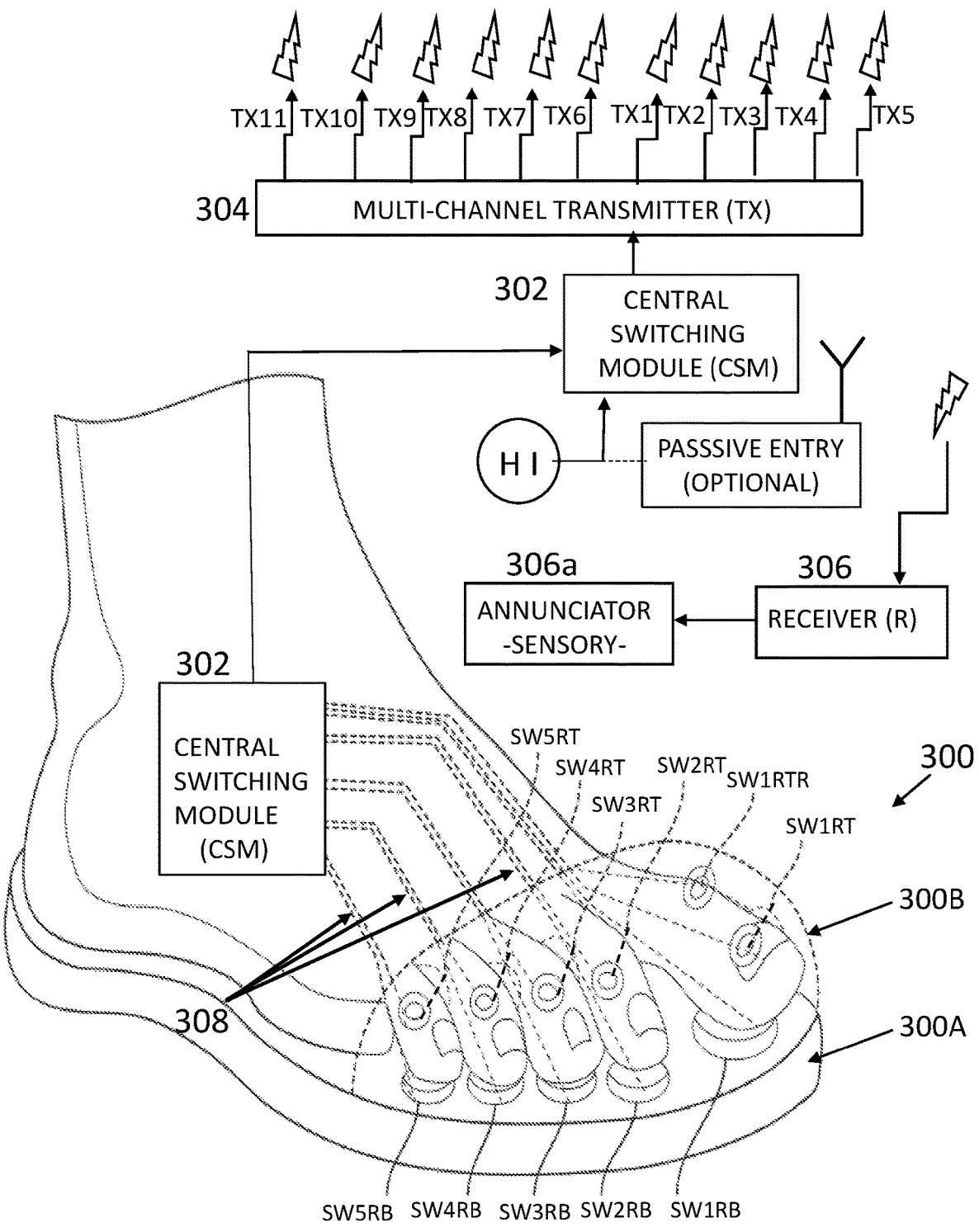
FIG. 4 illustrates a plan view of the combination insole and insole cover wireless network interface for a right shoe, according to the exemplary embodiment of FIG. 3.

FIG. 3 illustrates a top plan view of a combination insole 300A and insole cover 300B of a wireless network interface 300 configured to be inserted into a right shoe, according to another exemplary embodiment of the present inventive concept. FIG. 4 illustrates a perspective view of the combination insole 300A and insole cover 300B of the wireless network interface 300 configured to be inserted into a right shoe, according to the exemplary embodiment of FIG. 3. While the insole 300A is configured to be seated within a shoe, the insole cover 300B is configured to be inserted at the front-most part of the shoe and to sit along a top front portion of the shoe, such that a user's right foot (i.e., the toes) will rest between the insole 300A and the insole cover 300B. It is to be noted that the wireless network interface 300 can be alternatively inserted into a boot, sneaker, or any other type of footwear.

Referring to FIGS. 3 and 4, a first set of five switches: switch 1 right bottom SW1RB; switch 2 right bottom SW2RB; switch 3 right bottom SW3RB; switch 4 right bottom SW4RB and switch 5 right bottom SW5RB, can be disposed toward the front portion of the insole 300A and at positions where five toes of a user will rest, respectively, when a right foot of a user is placed on the insole 300A of the wireless interface 300. By pushing down on any one of the toes of the right foot while the foot is placed on the wireless interface 300, a corresponding switch among the first set of switches SW1RB-SW5RB can be pressed, thus enabling a predetermined instruction signal corresponding to the pressed switch. A second set of five switches: switch 1 right top SW1RT; switch 2 right top SW2RT; switch 3 right top SW3RT; switch 4 right top SW4RT; and switch 5 right top SW5RT, can be disposed on a surface of the insole cover 300B at positions directly above where the five respective toes of the user will rest when the right foot is placed on the insole 300A. These switches SW1RT-SW5RT are preferably disposed facing downward toward areas in which a respective toe is placed when resting on the insole 300A. By lifting any one of a user's toes a corresponding one of the second set of switches SW1RT-SW5RT can be pressed to enable a predetermined signal for the pressed switch.

Additionally, a third set of switches: switch 1 right top retracted SW1RTR; switch 2 right top retracted SW2RTR; switch 3 right top retracted SW3RTR; switch 4 right top retracted SW4RTR; and switch 5 right top retracted SW5RTR, can be disposed behind the second set of switches SW1RT-SW5RT and also facing downward such that by bending or curling ones toes the joint of each toe can press a corresponding one of the third set of switches SW1RTR-SW5RTR to enable a predetermined signal for each pressed switch. Accordingly, fifteen different switches can be provided to enable fifteen different signals with the wireless interface 300. As pointed out above, separate combinations of any of the switches can also be configured to enable yet another predetermined signal to perform a different operation when pressed together.

The wireless network interface 300 can also be configured to have embedded therein a Central Switching Module 302, a wireless Multi-channel (TX) 304, and a wireless Receiver R 306. The Central Switching Module 302 can be directly connected to each of the switches SW1RB-SW5RB, SW1RT-SW5RT and SW1RTR-SW5RTR via a wiring harness 308. The wiring harness 308 can be configured to send a unique enable signal from each of the switches SW1RB-SW5RB, SW1RT-SW5RT and SW1RTR-SW5RTR to the Central Switching Module 302 when one of the switches SW1RB-SW5RB, SW1RT-SW5RT and SW1RTR-SW5RTR (or a combination thereof) is pressed with a corresponding toe of a user's foot resting on the insole 300A and inserted within the insole cover 300B of the wireless interface 300. When one of the switches SW1RB-SW5RB, SW1RT-SW5RT and SW1RTR-SW5RTR (or a predetermined combination) is pressed, the Central Switching Module 302 will receive a predetermined enable signal from the corresponding switch (or switches) being pressed. The Central Switching Module 302 will then forward the enabled signal to the Multi-channel Transmitter TX 304. In response to receiving a predetermined enable signal from the Central Switching Module 302 the Multi-channel Transmitter TX 304 can wirelessly transmit a corresponding one of the coded radio frequency signals TX1, TX2, TX3 . . . or TX11 externally, depending on which one (or combination) of the switches SW1RB-SW5RB, SW1RT-SW5RT and SW1RTR-SW5RTR being pressed. For example, if switch SW1RB is pressed, the Multi-channel Transmitter TX 104 will wirelessly transmit a corresponding coded radio frequency signal TX1, which will be received by an external controlled device. As described above with reference to FIGS. 1-2, the external controlled device is configured to receive the wireless transmitted signals from the Multi-channel Transmitter TX 304 and in response control different electronic operational features of an external electronic apparatus, such as an external electric apparatus illustrated in FIG. 5. These switches can be enabled independently of each other or can be enabled in tandem. When configured to operate in tandem a combination of switches can be configured to cause the Central Switching Module 302 to provide a different predetermined enable signal to the Multi-channel Transmitter TX 304, which in turn can wirelessly transmit a predetermined coded radio signal corresponding to the combination of switches pressed.

In addition to the features described above with respect to the wireless network interfaces 100 and 300 illustrated in FIGS. 1-2 and 3-4, respectively, the wireless network interfaces 100 and 300 illustrated in FIGS. 1-2 and 3-4 can also be configured to send signals directly to another one of the wireless network interfaces 100 and 300 illustrated in FIGS. 1-2 and 3-4 worn by another user, such that direct communications can be conducted between two separate wireless network interfaces 100 and 300, as illustrated in FIGS. 1-2 and 3-4. More specifically, one wireless network interface 100 or 300 can be configured to send a signal to a second separate wireless network interface 100 or 300 worn by another user to communicate information. The second wireless network interface 100 or 300 will receive a transmitted signal through the receiver 106 or 306, and a notification can alert the user of the second wireless network interface 100 or 300 of that a transmitted signal was received through the annunciator 106a or 306a. An example of the notification through the annunciator can be a vibration. The notification signals can have different types of vibrations, including patterns or lengths of vibration corresponding to the type of notification signal being transmitted.

Figure 5:
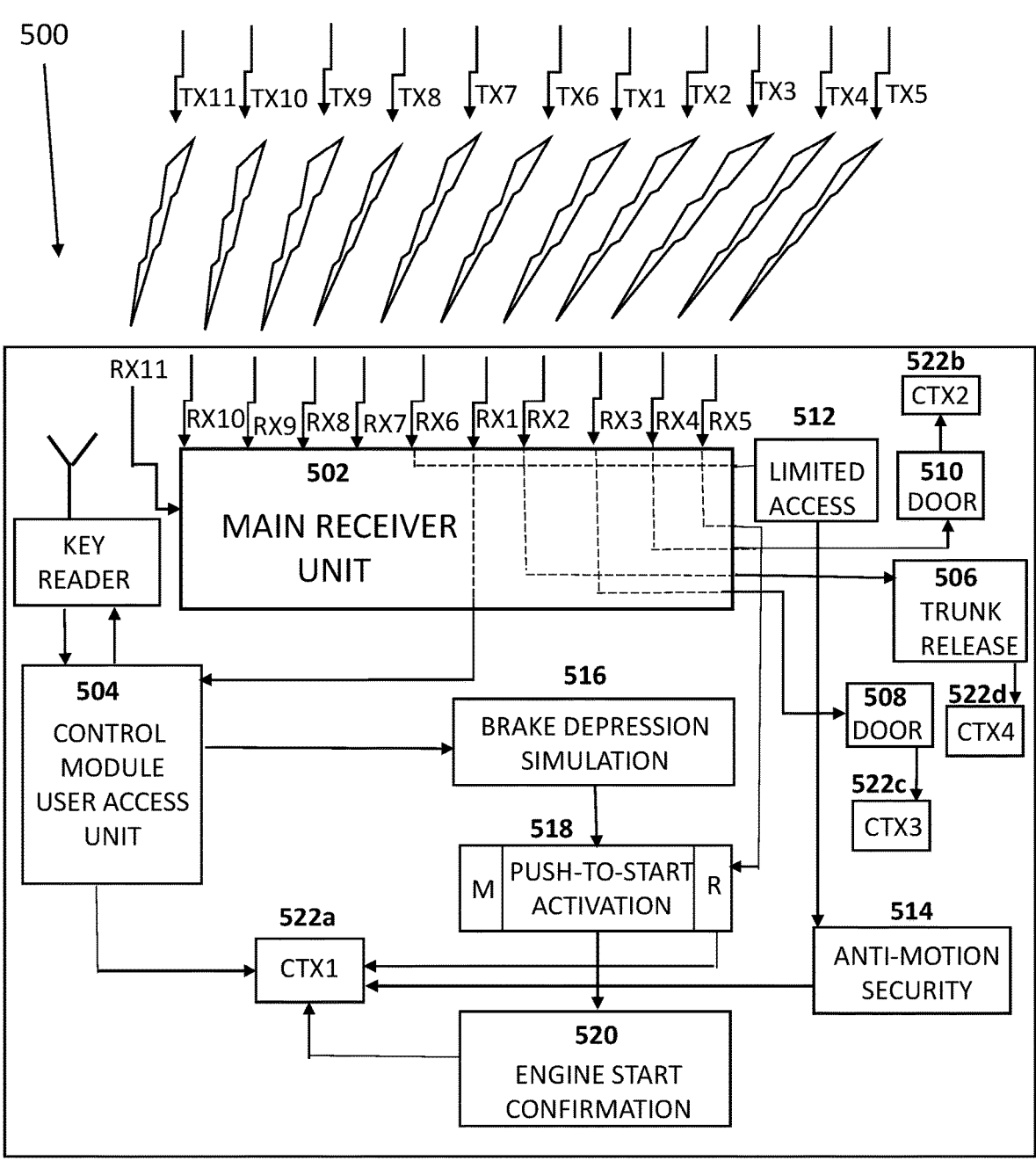
FIG. 5 illustrates modular wireless controlled device, according to an exemplary embodiment of the present inventive concept.
Figure 6:
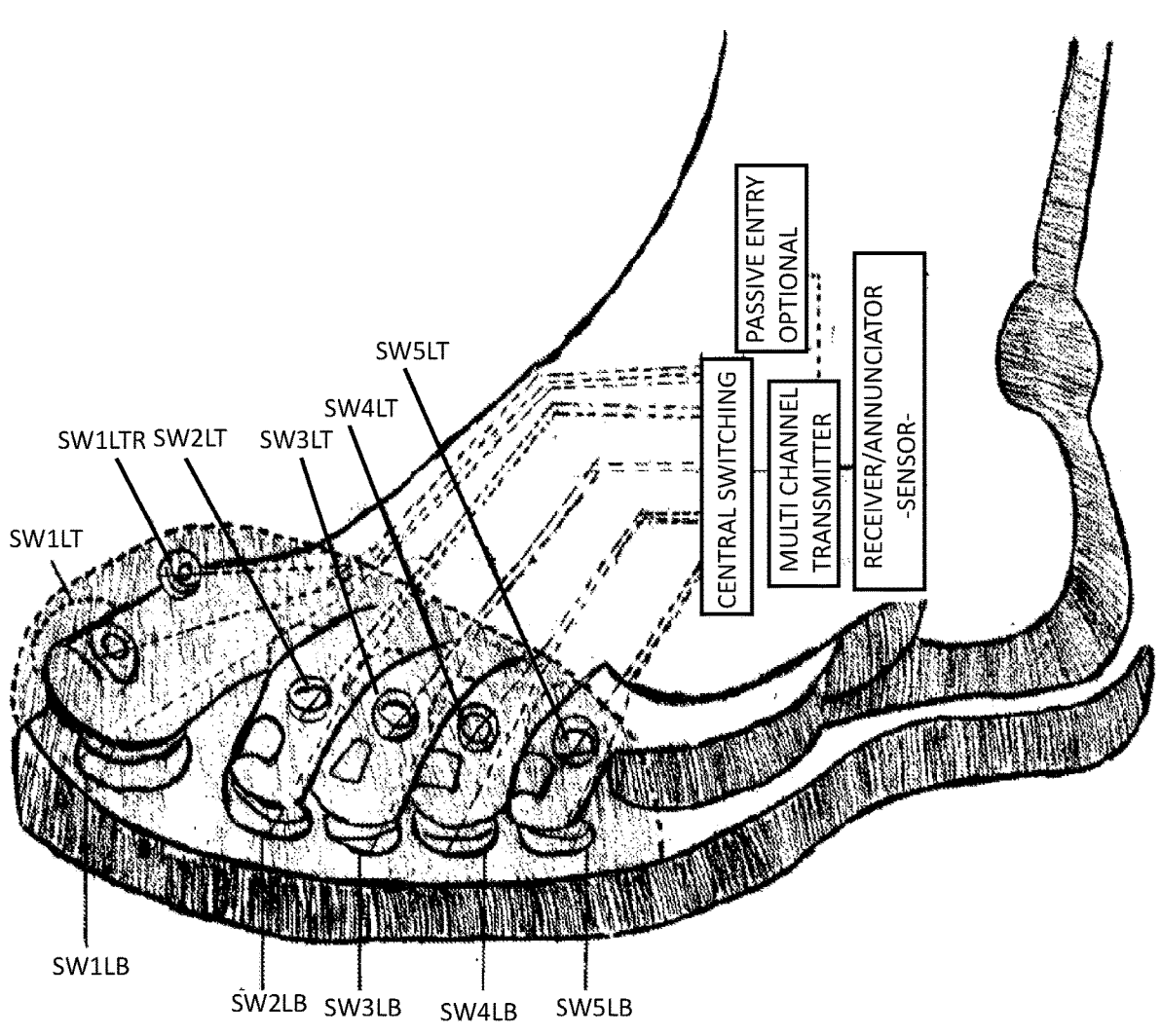
FIG. 6 illustrates a plan view of an insole wireless network interface and an insole cover wireless network interface for a left shoe, according to another exemplary embodiment of the present inventive concept.

FIG. 5 illustrates modular wireless controlled device 500, according to an exemplary embodiment of the present inventive concept. This wireless controlled device 500 can be configured to receive wireless transmitted signals from the insole wireless network interface 100 and the combination wireless network interface 300. It is to be noted that the modular wireless controlled device 500 can be configured to receive wireless transmission signals from any of the wireless network interfaces described herein. The modular wireless controlled device 500 can include a Multi-Channel Receiver Unit 502, which is configured to process the plurality of wireless transmitted radio signals TX1, TX2, TX3 . . . . TXn, which command/instruct the modular wireless controlled device 500 to perform specific operations, as described in more detail below.

The wireless transmitted radio signals TX1, TX2, TX3 . . . . TXn are received by the Multi-Channel Receiver Unit 502 as commands related to performing predetermined operations on an electronically controlled system in which the modular wireless controlled device 500 is connected thereto. A few examples of electronically controlled systems in which the wireless controlled device 500 can be wired to include, for example, a vehicle, a personal residence, etc. However, for brevity of the present detailed description the wireless controlled device 500 will be described as being wired to a vehicle.

These wireless transmitted radio signals TX1, TX2, TX3 . . . . TXn are received at corresponding receiver channels RX1, RX2, RX3 . . . . RXn of the modular wireless controlled device 500 and then processed by the Multi-Channel Receiver Unit 502 into corresponding control signals to operate different electronic operational features of an external electronically controlled system, such as, for example an automobile. For example, the modular wireless controlled device 500 can be wired to an automobile having a plurality of electronic operational features, such as, for example, an "unlock" feature for doors, a "trunk release" feature to unlock/open a trunk or rear door, a brake depression feature, a push-to-start feature, an engine start feature, a "limited access" feature, such as allowing a valet to open a driver side door and park the vehicle, or limited access" feature to allow a passenger to enter a running vehicle while leaving other features inaccessible, such as disabling access to the vehicle's transmission, etc. Accordingly, as illustrated in FIG. 5, if a user of the insole wireless interface 100 or the combination wireless interface 300 presses a pre-designated switch, such as switch SW1R or switch SW1RB, a radio signal TX1 can be wirelessly transmitted to the modular wireless controlled device 500 and received at channel RX1 to be processed by the Multi-Channel Receiver Unit 502 into a signal that is configured to exclusively allow the modular wireless controlled device 500 to access and operate (504) the vehicle in which the modular wireless controlled device 500 is installed. Then by pressing switch SW2R or SW2RB, a radio signal TX2 can be wirelessly transmitted to the modular wireless controlled device 500 and received at channel RX2, where the radio signal TX2 will be processed by the Multi-Channel Receiver Unit 502 into a signal configured to release a trunk (506) of the vehicle in which the modular wireless controlled device 500 is installed. Another example of the operations of the combination of the insole wireless network interface 100 (or the combination insole wireless network interface 300) and the modular wireless controller device 500 is where a user can press two switches in tandem, for example switches SW1R and SW6R (or SW1RB and SW6RB), which can result in wirelessly transmitting coded signals TX1 and TX6 to the modular wireless controlled device 500. The signals TX1 and TX6 will be received at corresponding channels RX1 and RX6, and will then be processed to exclusively allow the user to access the vehicle (504) and depress the brake (516) of the vehicle, while providing limited access to the vehicle by disabling the security of the vehicle. Then, by pressing switch SW5R or SW5RB, a radio signal TX5 can be wirelessly transmitted to the modular wireless controlled device 500 and received at channel RX5 to be processed into a signal configured to activate a known push-to-start button (518) and start the engine (520) of the vehicle in which the modular wireless controlled device 500 is installed. Since the vehicle must be accessed by the modular wireless controlled device 500 first, which requires disabling the security, and then the brake of the vehicle must be pressed before the engine will start, switches SW1R and SW6R (or SW1RB and SW6RB) and then SW5R (or SW5RB) will be pressed in this order to access the vehicle and then start the engine.

Each of the functions to be performed at the vehicle can be connected to a corresponding confirmation receipt device CTX1 (522a), CTX2 (522b), CTX3 (522c), CTX4 (522d) . . . . CTXn, which are each configured to wirelessly transmit a confirmation signal indicating that the corresponding coded transmission signal TX has been successfully received and the corresponding function has been performed. These confirmation signals can be received by the Receiver 106 of the insole 100 (or the Receiver 306 of the wireless interface 300), which will in turn activate the Annunciator 106 (or Annunciator 306) to notify the user that the function intended to be performed has in fact been performed. In other words, when a user has pressed switches SW1R and SW6R (or SW1RB and SW6RB) and then SW5R (or SW5RB) and the vehicle has been successfully accessed for control, the vehicle's brake has been depressed, the vehicle's security has been turned off, and the vehicle's engine has been started, the confirmation receipt device CTX1 (522a) will wirelessly transmit a signal back to the Receiver 106 of the insole 100 (or Receiver 306 of the wireless interface 300) indicating that these operations have been completed, and the user of the insole wireless network interface 100 (or the combination insole wireless network interface 300) can be notified of this by the Annunciator 106 (or Annunciator 306). The Annunciators 106 and 306 can be a sensory device, such as a mini-vibration device, which will vibrate at the insole 100 or wireless interface 300 to notify the user. Further, the confirmation receipt device CTX1 (522a) (and any other confirmation receipt devices 522b-522n can similarly wirelessly transmit a signal back to a Receiver 106 of a second insole wireless network interface 100 (or a Receiver 306 of a second insole wireless network interface 300) indicating that these operations have been completed, and the user of the first wireless network interface 100 (or the combination insole wireless network interface 300) and the user of the second wireless network interface 100 (or the combination insole wireless network interface 300) can be notified of this by the corresponding Annunciator 106 (or Annunciator 306). It is to be noted that each of the confirmation receipt devices CTX1 (522a), CTX2 (522b), CTX3 (522c), CTX4 (522d) .... CTXn can be configured as one single confirmation receipt device.

It is well known that vehicles are initially operated with a wireless key. The wireless key is read by a key reader internally wired within the vehicle's electronics system. The Control Module User Access 504 of the modular wireless controlled device 500 can be configured to disable the key reader of the vehicle such that only the insole 100 or the wireless interface 300 can control access to the vehicle. With this exemplary embodiment there is no longer a need to carry around a key to access and operate a vehicle, but instead all the controls of a vehicle can be contained and hidden within a shoe worn by a user of the combination insole 100 (or wireless interface 300) and modular wireless controlled device 500 system.

According to another example operation of the modular wireless controlled device 500, a vehicle can be controlled to open a driver's side door (510) by transmitting a radio frequency coded signal TX4, which will be received at channel RX4 of the modular wireless controlled device 500 system and processed to unlock the driver's side door 510. Then the Control Module User Access Unit 504 can be operated to start the engine of the vehicle, as described above, while the vehicle can also be disabled from being moved. More specifically, while the engine of the vehicle is being started and accessible by anyone through the unlocked door (510), a signal TX6 can be wirelessly transmitted by pressing the switch SW6R or SW6RB, which will be received at channel RX6. The signal TX6 will then be processed by the Main Receiver Unit 502 and provided to the Limited Access unit 512, which will control an Anti-Motion Security Unit 514 to lock the transmission in the "parked" position, thus preventing the vehicle from moving. The confirmation receipt device CTX1 will transmit a signal back to the Receiver 106 of the insole wireless network interface(s) 100 (or Receiver 306 of the wireless interface 300) indicating that these operations have been completed, and the user of the wireless network interface(s) 100 (or Receiver 306 of the wireless interface 300) can be notified of this by the Annunciator 106 (or Annunciator 306).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. A wireless network interface insole for a footwear, comprising:
a plurality of first switches integrated into the insole to correspond with bottom surfaces of toes of a user of the footwear, each switch configured to generate a corresponding electronic signal when pressed;
an insole cover extending from and disposed above a front end of the insole, the insole cover including a plurality of second switches integrated therein to correspond with top surfaces of toes of the user of the footwear, each of the second switches configured to generate a corresponding electronic signal when pressed by the tops of the user's toes and to transmit the generated electronic signals to a central switching module;
a central switching module electrically connected to each of the plurality of first and second switches to receive the electronic signals generated by the plurality of first and second switches, to process the received signals and to transmit the processed signals;
a multi-channel transmitter TX to receive the processed signals from the central switching module and to generate and transmit a unique coded radio frequency signal to perform a function for each of the processed signals received; and
a receiver to receive an indication signal from an external device in response to each coded radio frequency signal transmitted indicating that the corresponding function has been performed.
2. The wireless network interface insole according to claim 1, wherein:
the plurality of first switches includes five switches, each switch being configured to rest within the insole and under a respective one of five toes of a user; and
the plurality of second switches include five switches, each switch being configured to be attached within the insole cover and above a respective one of the five toes of the user.
3. The wireless network interface insole according to claim 2, further comprising:
an annunciator disposed therein to signal the user that an indication signal has been received.
4. The wireless network interface insole according to claim 2, further comprising:
an external electronically controlled device including:
a main receiver unit including a plurality of receivers, each receiver configured to receive a corresponding one of the unique coded radio frequency signals transmitted by the multi-channel transmitter TX and to transmit the coded radio frequency signals to a corresponding activation device; and
at least one activation device configured to activate a connected device when a coded radio frequency signal is received from a receiver of the main receiver unit.
5. The wireless network interface insole according to claim 4, wherein the at least one activation device includes a plurality of activation devices, and the connected device includes at least one of an electronic door lock of a vehicle, a trunk release switch of a vehicle, an ignition of a vehicle, a brake of a vehicle.
6. The wireless network interface insole according to claim 4, wherein the at least one activation device includes a plurality of activation devices, and the connected device includes at least one of an electronic door lock of a residence, an electronic garage door opener, and main lights of the residence.
7. An active personal wireless connectivity network system, comprising:
a wireless network interface insole system insertable into a footwear, the wireless network interface insole including:

an insole including a plurality of first electronic switches disposed therein, each electronic switch configured to align with a bottom surface of a corresponding toe of a user's foot that rests on the insole;

an insole cover connected to and disposed above a front end of the insole, the insole cover including a plurality of second switches integrated therein to correspond with top surfaces of toes of the user of the footwear, each switch configured to generate a corresponding electronic signal when pressed by the top surface of the user's corresponding toe and to transmit the generated electronic signals to the central switching module;

a central switching module configured to receive an electronic signal from each of the plurality of first and second electronic switches which are pressed by a corresponding toe, to process the received electronic signals and to transmit the processed signals; and a multi-channel transmitter TX to receive the processed signals from the central switching module and to generate and transmit a unique coded radio frequency signal for each of the processed signals received; and an external electronically controlled device configured to be connectable to a plurality of electronically operated devices of a vehicle, the external electronically controlled device including:

a main receiver unit including a plurality of receivers, each receiver configured to receive a corresponding one of the unique coded radio frequency signals transmitted by the multi-channel transmitter TX and to operate a corresponding one of the plurality of electronically operated devices of the vehicle.

8. The active personal wireless connectivity network system according to claim 7, wherein the wireless network interface insole further comprises:

a receiver to receive an indication signal from the external electronically controlled device in response to each coded radio frequency signal transmitted indicating that one of the plurality of electronically operated devices has been operated; and an annunciator disposed therein to signal the user that the indication signal has been received.

* * * * *